US008738657B2

(12) United States Patent
Kuno et al.

(10) Patent No.: US 8,738,657 B2
(45) Date of Patent: May 27, 2014

(54) DISTRIBUTION OF KEY VALUES

(75) Inventors: Harumi Kuno, Cupertino, CA (US);
Goetz Graefe, Madison, WI (US);
Wojciech Golab, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 13/246,715

(22) Filed: Sep. 27, 2011

(65) Prior Publication Data

US 2013/0080473 A1     Mar. 28, 2013

(51) Int. Cl.
*G06F 17/30*          (2006.01)

(52) U.S. Cl.
USPC ........................................................ 707/797

(58) Field of Classification Search
USPC .......................................... 707/797, 999.101
See application file for complete search history.

(56) References Cited

U.S. PATENT DOCUMENTS

| | | | |
|---|---|---|---|
| 5,717,919 A * | 2/1998 | Kodavalla et al. ..... | 707/999.008 |
| 5,960,194 A | 9/1999 | Choy et al. | |
| 6,223,182 B1 | 4/2001 | Agarwal et al. | |
| 7,571,188 B1 * | 8/2009 | Schwetman et al. ... | 707/999.104 |
| 7,953,717 B2 | 5/2011 | Graefe | |
| 8,386,463 B2 * | 2/2013 | Bestgen et al. ............... | 707/713 |
| 2006/0204008 A1 * | 9/2006 | Matsushita ................... | 380/255 |
| 2008/0065672 A1 | 3/2008 | Bamford et al. | |
| 2009/0271408 A1 * | 10/2009 | Graefe ................... | 707/999.008 |
| 2010/0082664 A1 * | 4/2010 | Odaira .......................... | 707/769 |
| 2010/0241614 A1 | 9/2010 | Shaull et al. | |
| 2011/0320496 A1 * | 12/2011 | Reid et al. ..................... | 707/797 |

OTHER PUBLICATIONS

Ibrahim et al., LEEN: Locality/Fairness-Aware Key Partitioning for MapReduce in the Cloud, Nov. 30-Dec. 3, 2010. Retrieved on Mar. 8, 2013 from http://salsahpc.indiana.edu/CloudCom2010/slides/PDF/LEEN%20LocalityFairness-Aware%20Key%20Partitioning%20for%20MapReduce%20in%20the%20Cloud.pdf.*
Kwon et al., SkewTune: mitigating skew in mapreduce applications, ACM Digital Library. Providing date verification of Ibrahim reference. Retrieved on Mar. 8, 2013 from http://dl.acm.org/citation.cfm?id=2213840.*
Goetz et al., Adaptive Indexing for Relational Keys, SMDB 2010, Long Beach, CA Mar. 1, 2010. Retrieved on Mar. 7, 2013 from http://www.hpl.hp.com/techreports/2010/HPL-2010-23.pdf.*
Burleson Consulting, 'Index Leaf Block Contention Tuning', Mar. 22, 2010. Retrieved on Mar. 5, 2013 from http://www.dba-oracle.com/t_index_leaf_block_contention_tuning.htm.*

* cited by examiner

*Primary Examiner* — Cam-Linh Nguyen (57) ABSTRACT

A computer apparatus and related method to reduce database congestion is provided. In one aspect, the computer apparatus and method may generate a new partition within a hierarchical data structure of interlinked nodes, if a distribution of key values stored in the hierarchical data structure is skewed in favor of a range of key values.

20 Claims, 10 Drawing Sheets

Fig. 8

DISTRIBUTION OF KEY VALUES

BACKGROUND

Database management software may utilize various hierarchical data structures to store data and to accelerate searches of stored data. One type of data structure is a tree-structure that contains an assemblage of interlinked nodes, including a root node and one or more interior nodes leading to a plurality of leaf nodes. Interior nodes may contain two or more index entries whose key values are associated with lower ordered child nodes. The organization of the data structure is a reflection of the data, thus changes to the data may require changes to the arrangement of the nodes.

DETAILED DESCRIPTION

In order to maintain the data's consistency, a process updating the data structure may have exclusive access to particular nodes thereof. A latch contention occurs when multiple processes or threads simultaneously attempt to gain exclusive access to the same node. As a result, many threads or processes may be required to wait idly by until the latched nodes are released. Latch contentions are often due to skewed distributions of key values such that the nodes having those values are simultaneously sought after by several processes.

Various examples disclosed herein provide an apparatus and related method to distribute key values in order to minimize latch contentions. In one aspect of the present disclosure, a key value that is within a first range of key values may be generated. In another aspect of the present disclosure, it may be determined whether a distribution of key values stored in a hierarchical data structure of interlinked nodes is skewed in favor of the first range of key values. If the distribution is skewed in favor of the first range of key values, a logical partition may be initiated. In one example, the logical partition may represent a second range of key values different from the first range. In a further aspect of the disclosure, the logical partition may be associated with a partition value. The partition value may be attached to the generated key value so as to generate an altered key value. In a further example, data may be associated with the altered key value.

The aspects, features and advantages of the application will be appreciated when considered with reference to the following description of examples and accompanying figures. The following description does not limit the application; rather, the scope of the application is defined by the appended claims and equivalents.

Figure 1:
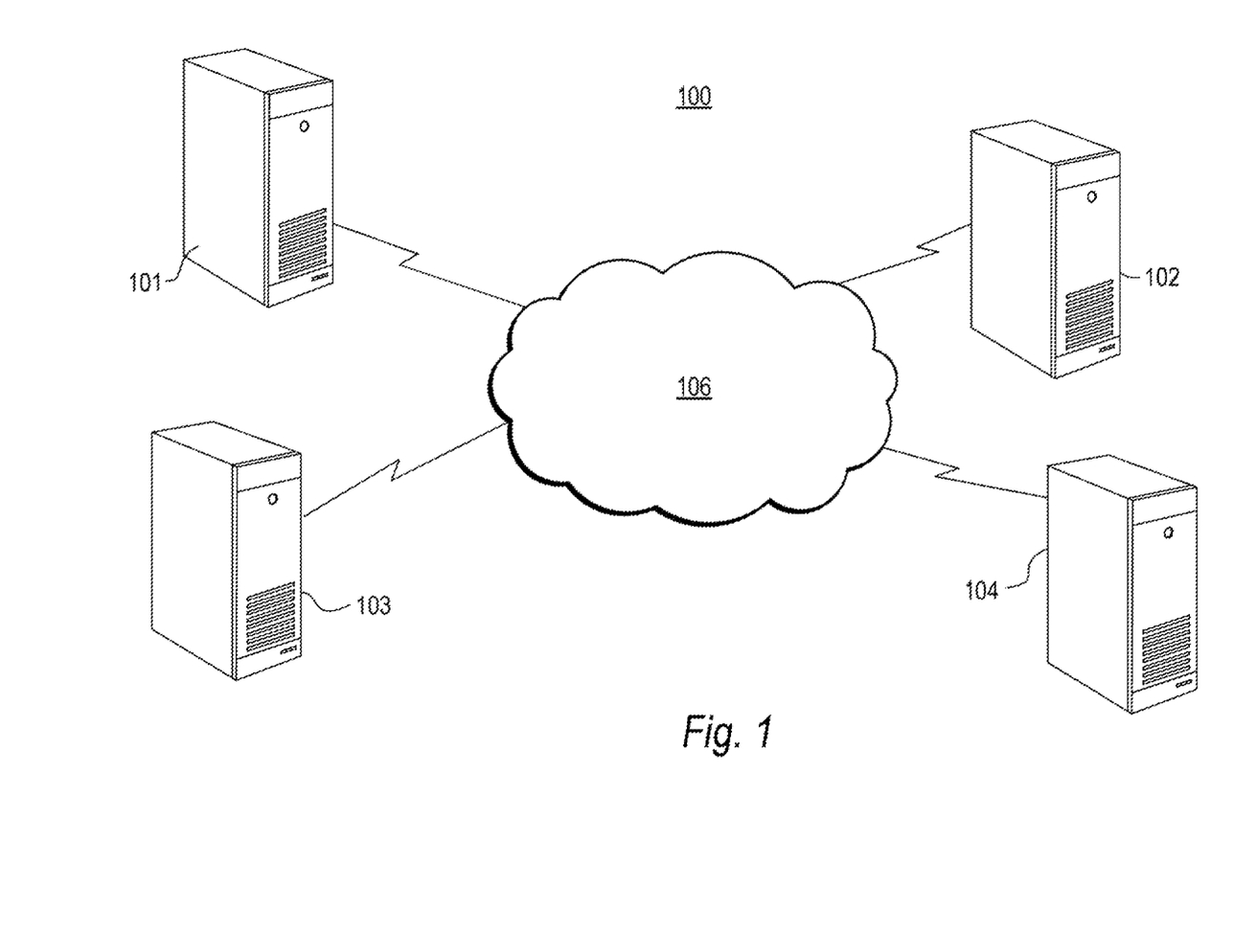
FIG. 1 is an illustrative system in accordance with aspects of the application.

FIG. 1 presents a schematic diagram of an illustrative system 100 depicting various computers 101, 102, 103, and 104 used in a networked configuration. Each computer may comprise any device capable of processing instructions and transmitting data to and from other computers, including a laptop, a full-sized personal computer, a high-end server, or a network computer lacking local storage capability. Moreover, each computer may comprise a mobile device capable of wirelessly exchanging data with a server, such as a mobile phone, a wireless-enabled PDA, or a tablet PC. Each computer apparatus 101, 102, 103, and 104 may include all the components normally used in connection with a computer. For example, each computer apparatus may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

The computers or devices disclosed in FIG. 1 may be interconnected via a network 106, which may be a local area network ("LAN"), wide area network ("WAN"), the Internet, etc. Network 106 and intervening computer devices may also use various protocols including virtual private networks, local Ethernet networks, private networks using communication protocols proprietary to one or more companies, cellular and wireless networks, instant messaging, HTTP and SMTP, and various combinations of the foregoing. Although only a few computers are depicted in FIG. 1, it should be appreciated that a typical network can include a large number of interconnected computers.

Figure 2:
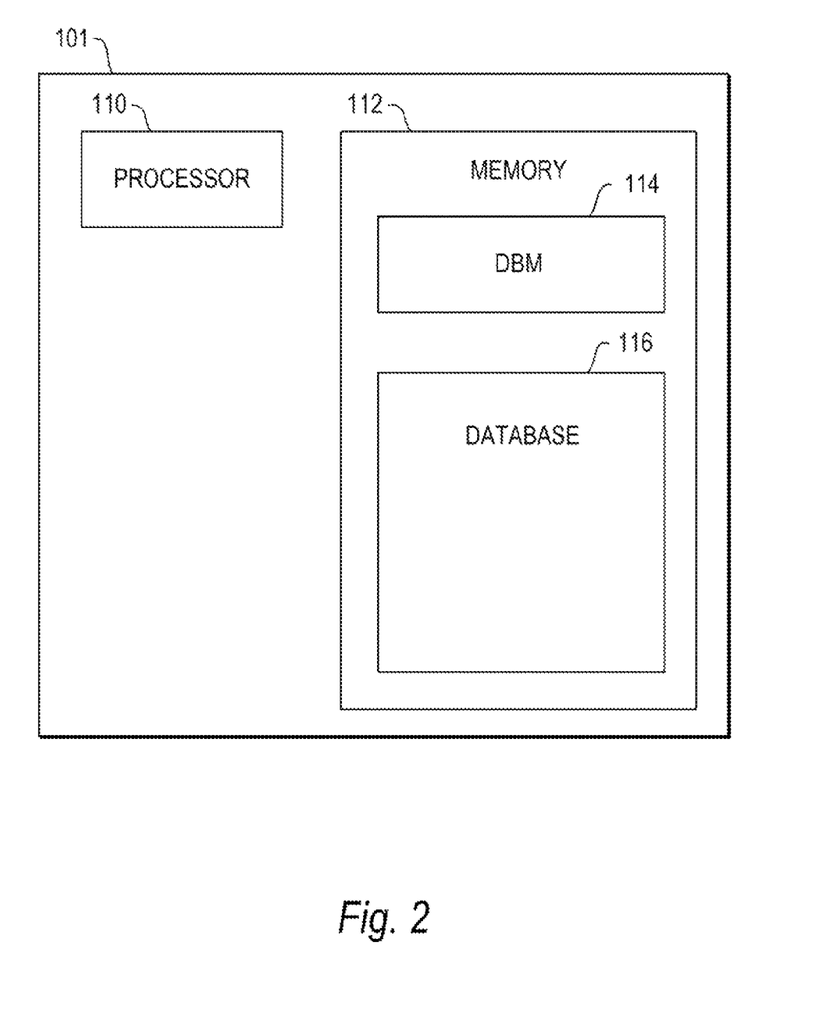
FIG. 2 is a close up illustration of a computer apparatus in accordance with aspects of the application.

FIG. 2 is a close up illustration of computer apparatus 101. In the example of FIG. 2, computer apparatus 101 is a database server with a processor 110 and memory 112. Memory 112 may store database management ("DBM") instructions 114 that may be retrieved and executed by processor 110. Furthermore, memory 112 may contain data in a database 116 that may be retrieved, manipulated, or stored by processor 110. In one example, memory 112 may be a random access memory ("RAM") device. Alternatively, memory 112 may comprise other types of devices, such as memory provided on floppy disk drives, tapes, and hard disk drives, or other storage devices that may be directly or indirectly coupled to computer apparatus 101. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC").

Although FIG. 2 functionally illustrates the processor 110 and memory 112 as being within the same block, it will be understood that the processor and memory may actually comprise multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

As noted above, computer apparatus 101 may be configured as a database server. In this regard, computer apparatus 101 may be capable of communicating data with a client computer such that computer apparatus 101 uses network 106 to transmit information for presentation to a user. Accordingly, computer apparatus 101 may be used to obtain database information for display via, for example, a web browser executing on computer 102. Computer apparatus 101 may also comprise a plurality of computers, such as a load balancing network, that exchange information with different computers of a network for the purpose of receiving, processing, and transmitting data to multiple client computers. In this instance, the client computers will typically still be at different nodes of the network than any of the computers comprising computer apparatus 101.

The DBM instructions 114 residing in memory 112 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative. DBM instructions 114 may configure processor 110 to reply to database queries, update the database, provide database usage statistics, or to serve any other database related function.

In one example, the DBM instructions 114 may be part of an installation package that may be executed by processor 110. In this example, memory 112 may be a portable medium such as a CD, DVD, or flash drive or a memory maintained by a server from which the installation package can be downloaded and installed. In another example, the DBM instructions 114 may be part of an application or applications already installed. Here, memory 112 may include integrated memory such as a hard drive.

Requests for database access may be transmitted from a remote computer via network 106. For example, computer 104 may be at a sales location communicating new data through network 106. This data may be, for example, new customer, sales, or inventory data. At the same time, computer 103 may be at a corporate office submitting database queries to DBM instructions 114, which may search database 116 and return the relevant data to computer 103 via network 106. Database 116 may be arranged as a balanced, hierarchical, tree-like data structure that relies on splitting and merging to maintain its balance. Some examples of such structures include, but are not limited to, B-trees, B-plus trees, or B-link trees.

Figure 3:
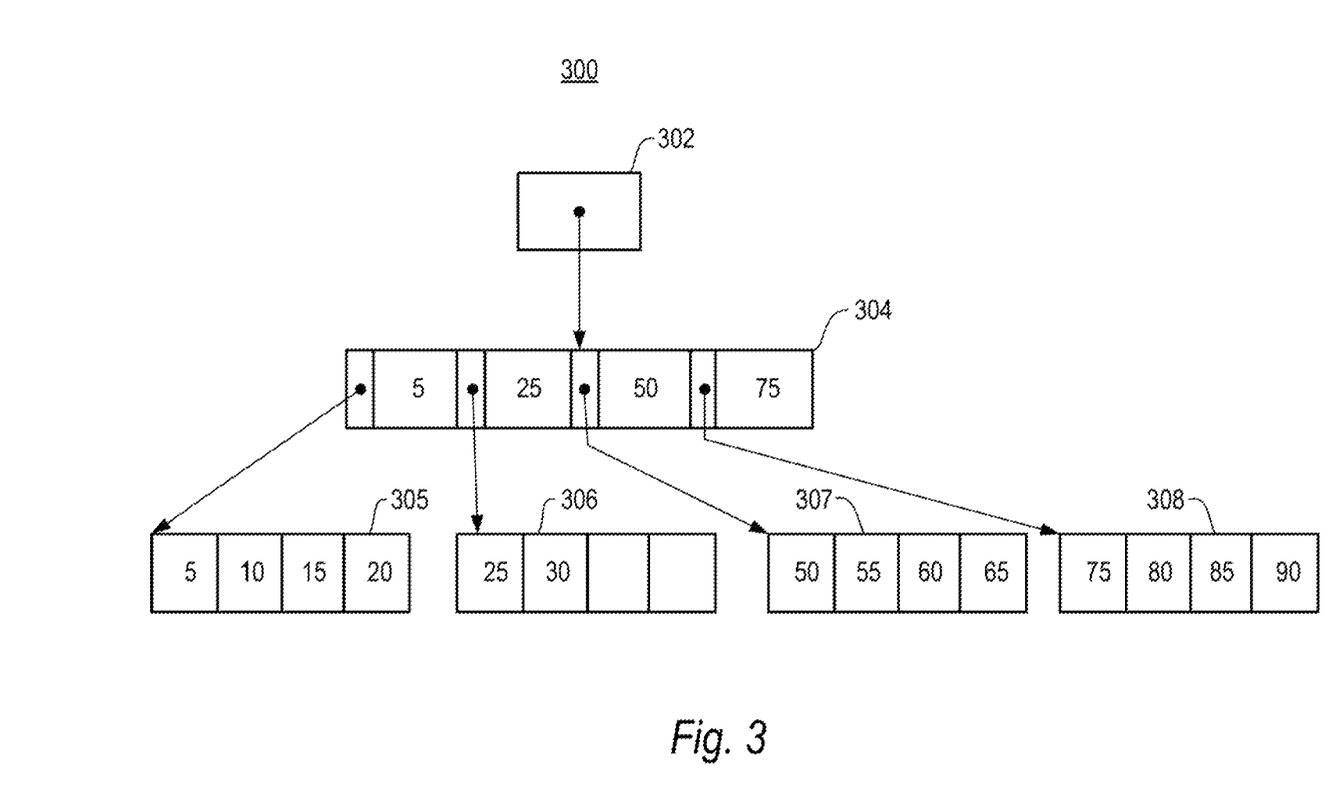
FIG. 3 is an illustrative data structure to maintain data.

FIG. 3 illustrates one possible tree data structure 300. The illustrative tree data structure is a B-plus tree having a root node 302 and one interior node 304 with four child nodes 305-308. Each child node is also a leaf node, since it is not a root node and it has no children. While a B-plus tree may be arranged in a variety of ways, the B-plus tree shown in FIG. 3 is configured to maintain its "balance," such that every path from the root node 302 to a leaf node 305-308 is of the same length. Particularly, the illustrative B-plus tree is configured to maintain its balance when new data is added or deleted. An interior node of a B-plus tree may have a predetermined number of index entries. Each index entry may contain a key value associated with a child node. The B-plus tree of FIG. 3 is configured such that each interior node maintains between n/2 and n index entries where n=4. The B-plus tree of FIG. 3 is further configured to store a minimum of two and a maximum of four data records in each child node 305-308. A child node may be a linked list of data records, which simplifies range queries. For ease of illustration, only the keys associated with the data in each child node 305-308 are shown. Each index entry of interior node 304 may also have a pointer associated with the first record of each linked list encompassing a child node. The foregoing properties of the illustrative B-plus tree aim to provide an efficient structure for housing the data. However, it is understood that the foregoing properties are illustrative and that other properties or restrictions may be enforced to enhance the structure's efficiency.

Figure 4:
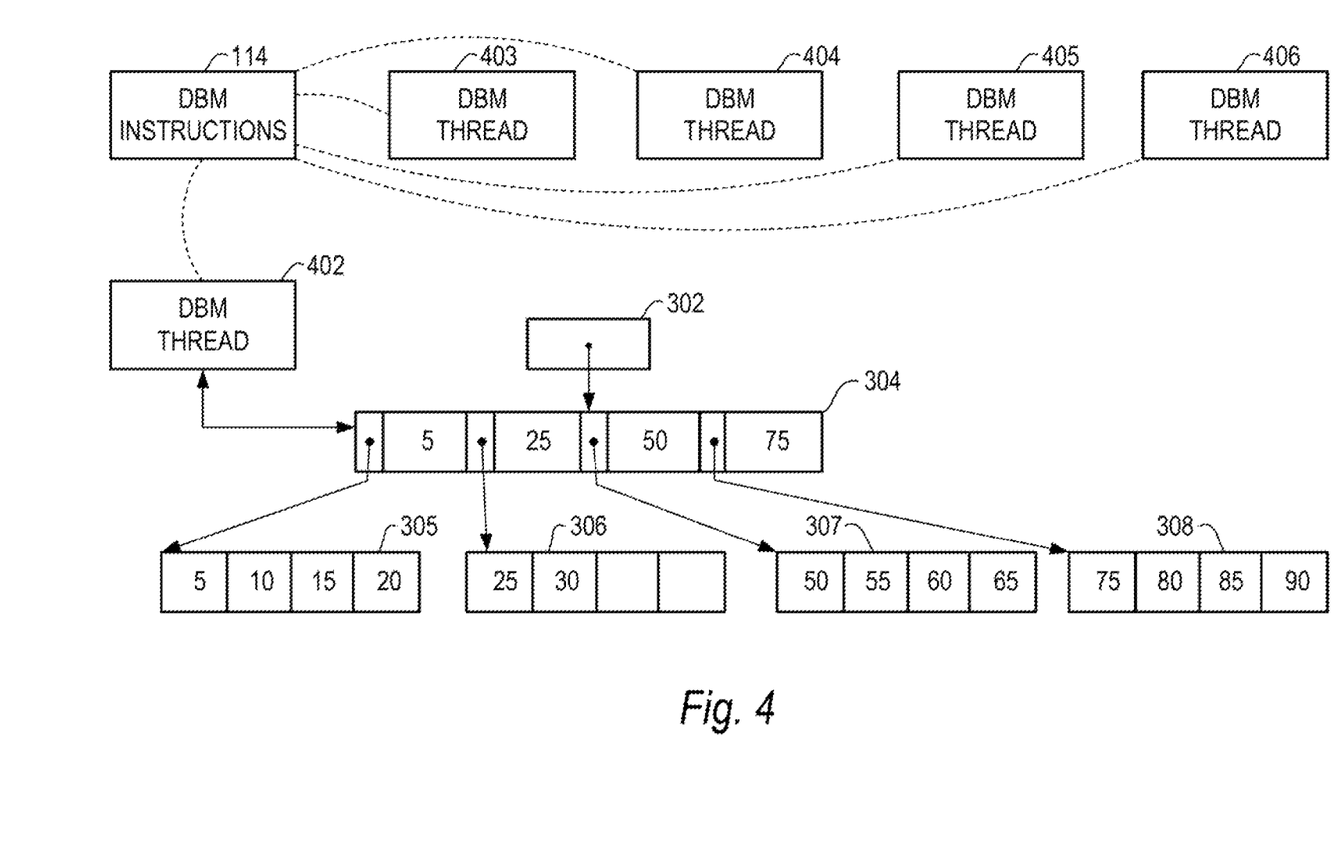
FIG. 4 demonstrates a latch contention occurring on an illustrative data structure.

FIG. 4 demonstrates an illustrative latch contention. In the example of FIG. 4, client computers 102-104 transmit multiple requests to DBM instructions 114 for access to child nodes 305-308. DBM instructions 114 may be multithreaded, allowing DBM instructions 114 to serve multiple requests simultaneously by generating multiple versions of itself within memory 112. Each DBM thread 402-406 represents a different version or thread of DBM instructions 114. DBM threads 402-406 require access to interior node 304 in order to access child nodes 305-308. DBM thread 402 is shown having exclusive access to interior node 304. Meanwhile, DBM threads 403-406 are shown waiting idly by until DBM thread 402 releases interior node 304. Each DBM thread 403-406 may be a request to insert a new record, to retrieve data, to delete data, or to update data. As database activity increases, additional threads will be required to wait before carrying out their respective tasks. While FIG. 4 illustrates a latch contention resulting from simultaneous requests for node 304, a latch contention may also result from simultaneous requests for any of the leaf nodes 305, 306, 307, or 308.

Figure 5:
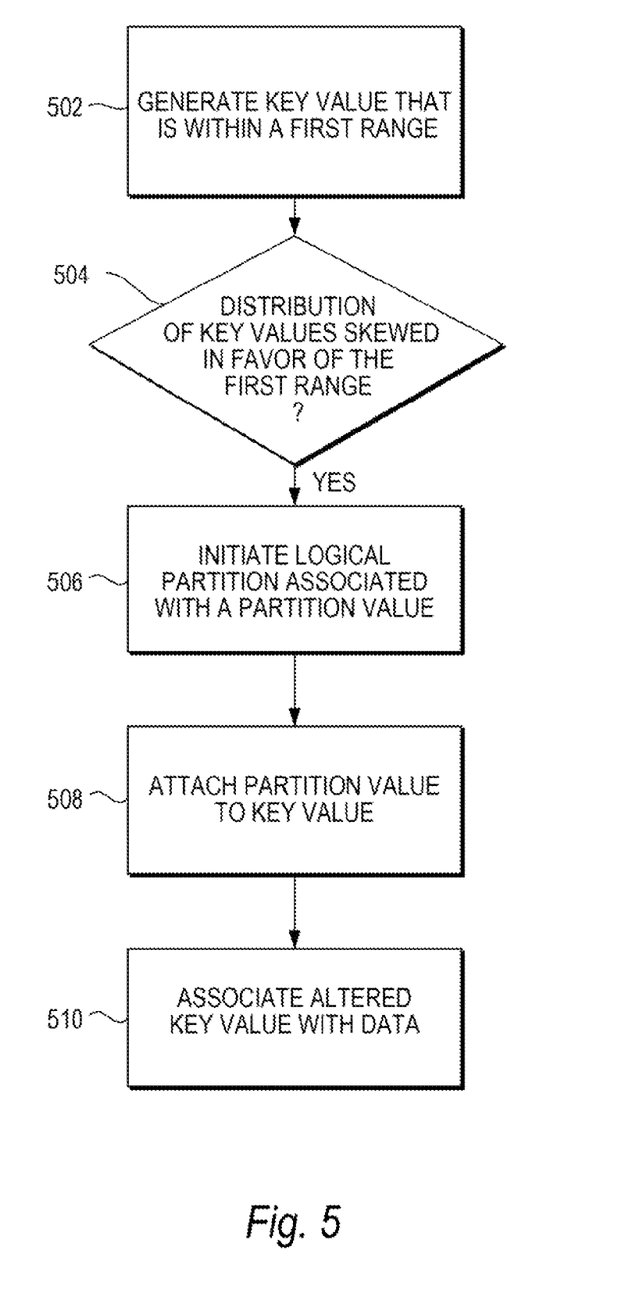
FIG. 5 is a flow diagram in accordance with aspects of the application.
Figure 6:
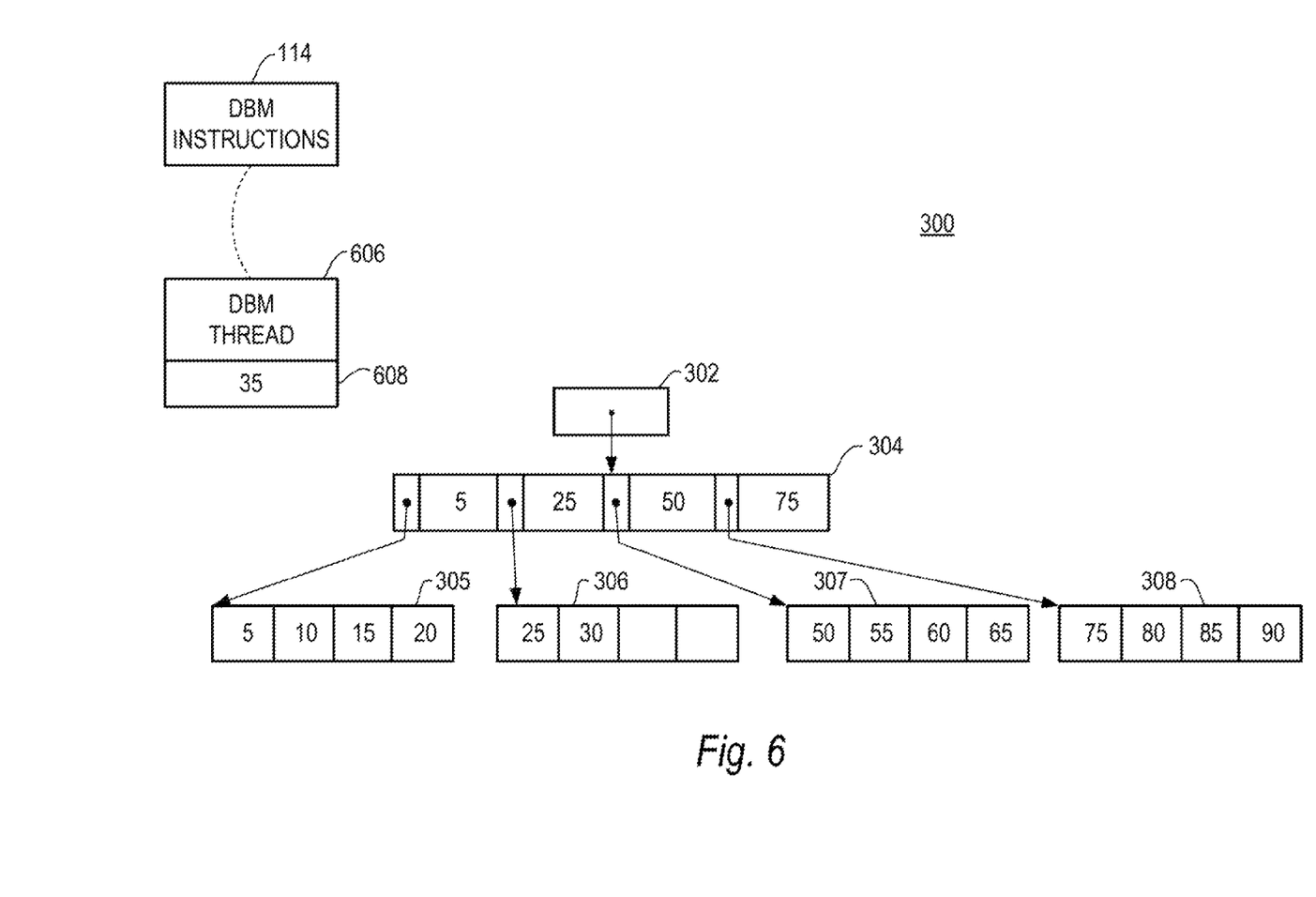
FIG. 6 is a working example in accordance with aspects of the application.
Figure 7A:
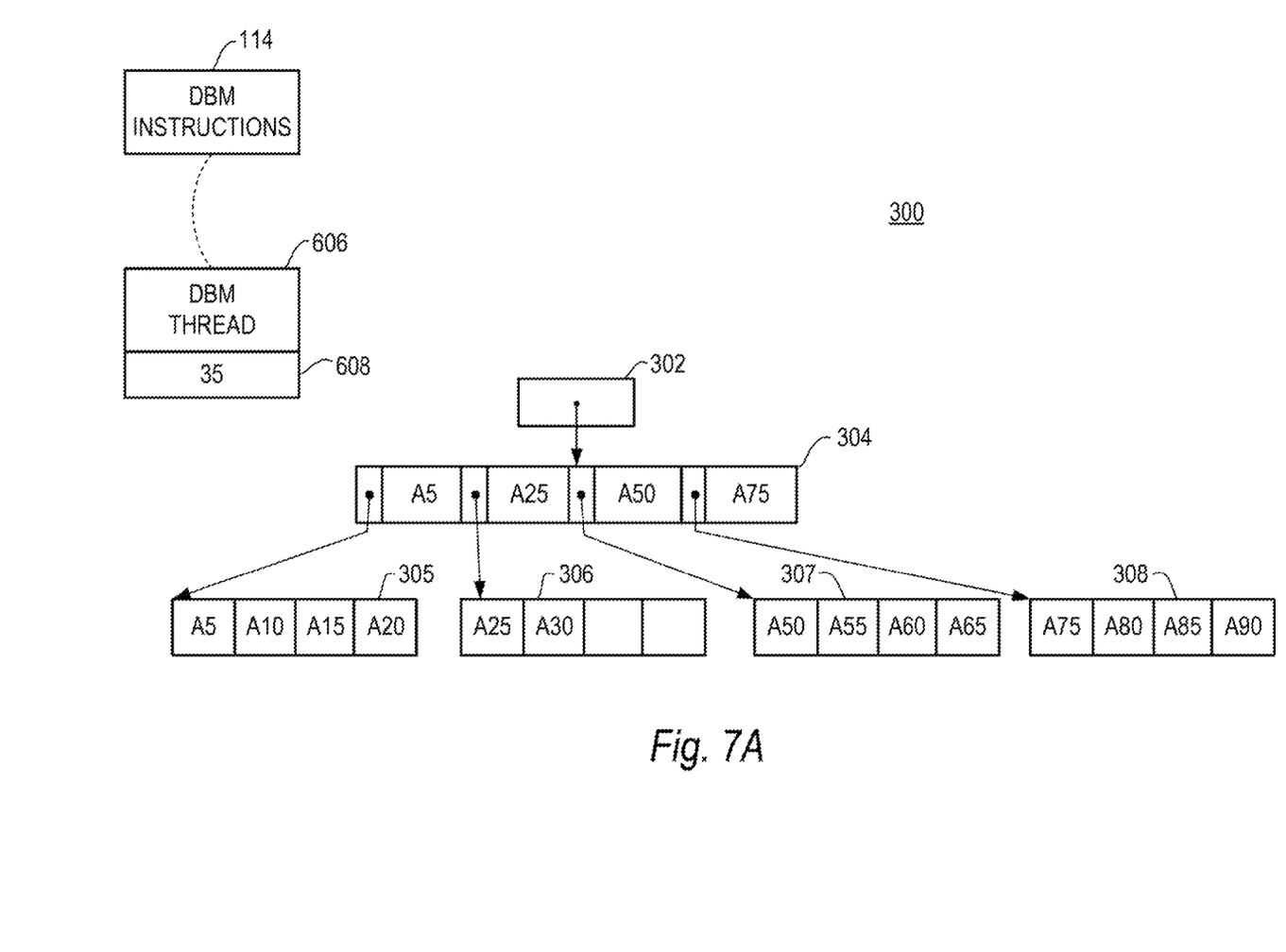
FIGS. 7A-C are working examples of partitions in accordance with aspects of the application.
Figure 7B:
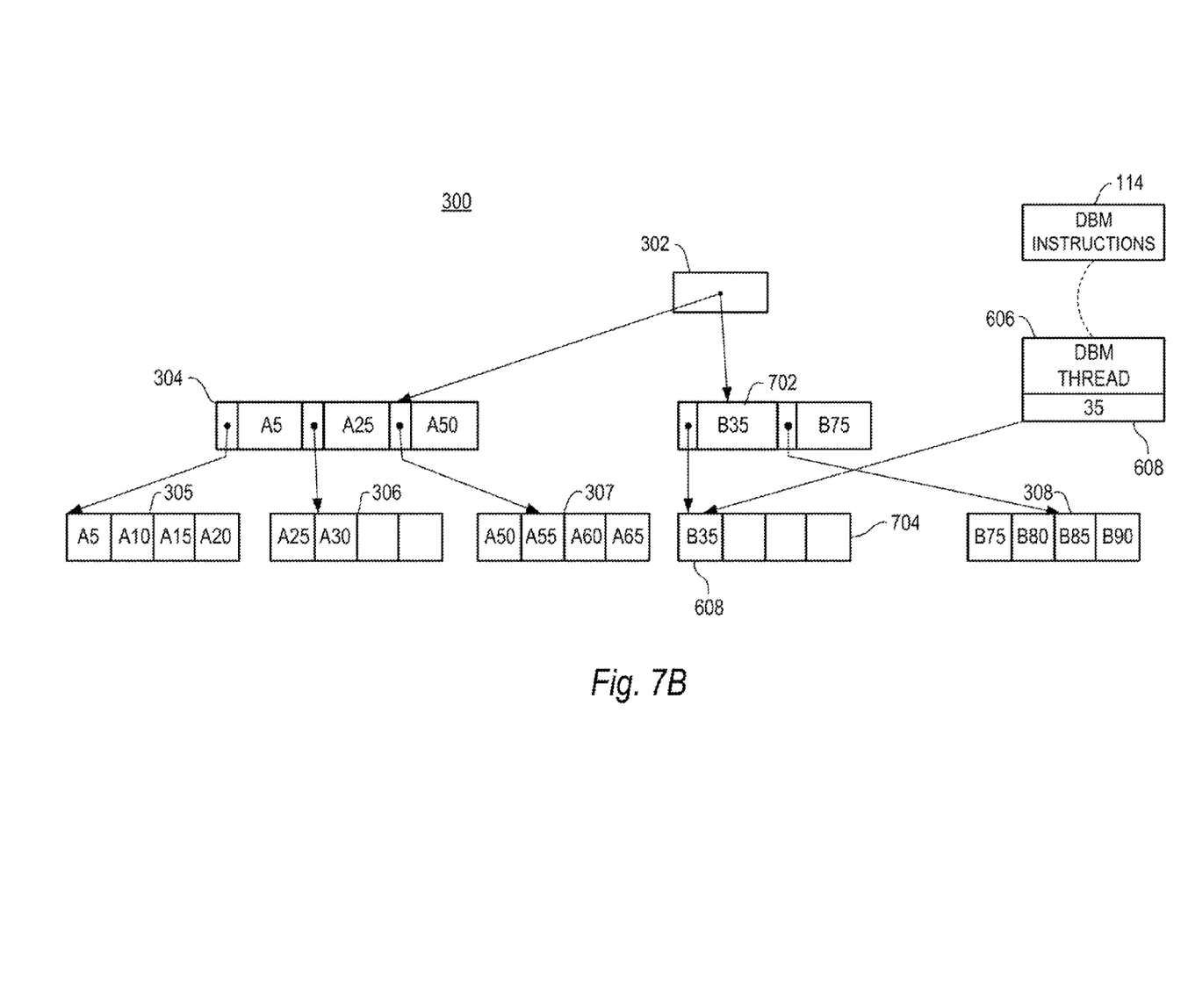
Figure 7C:
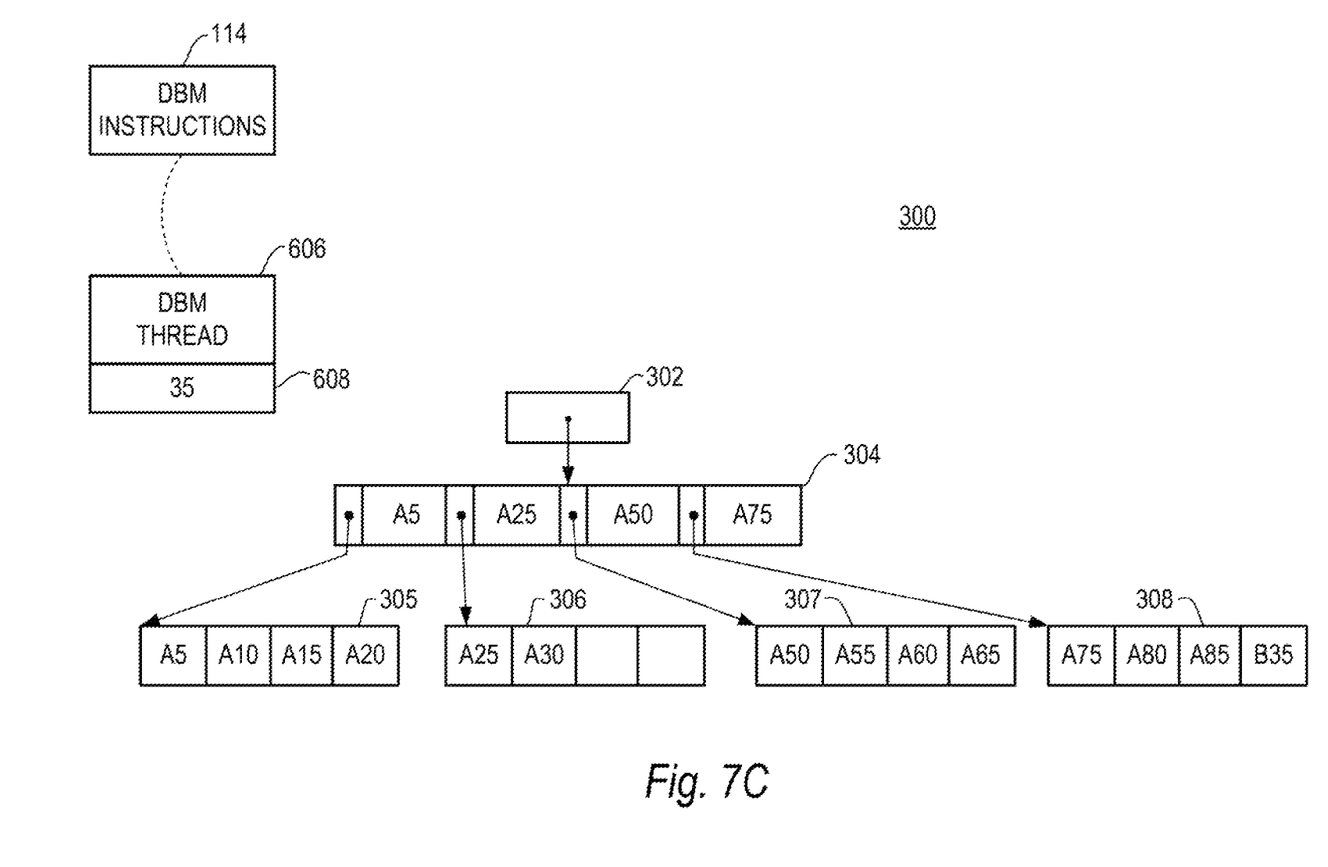
Figure 8:
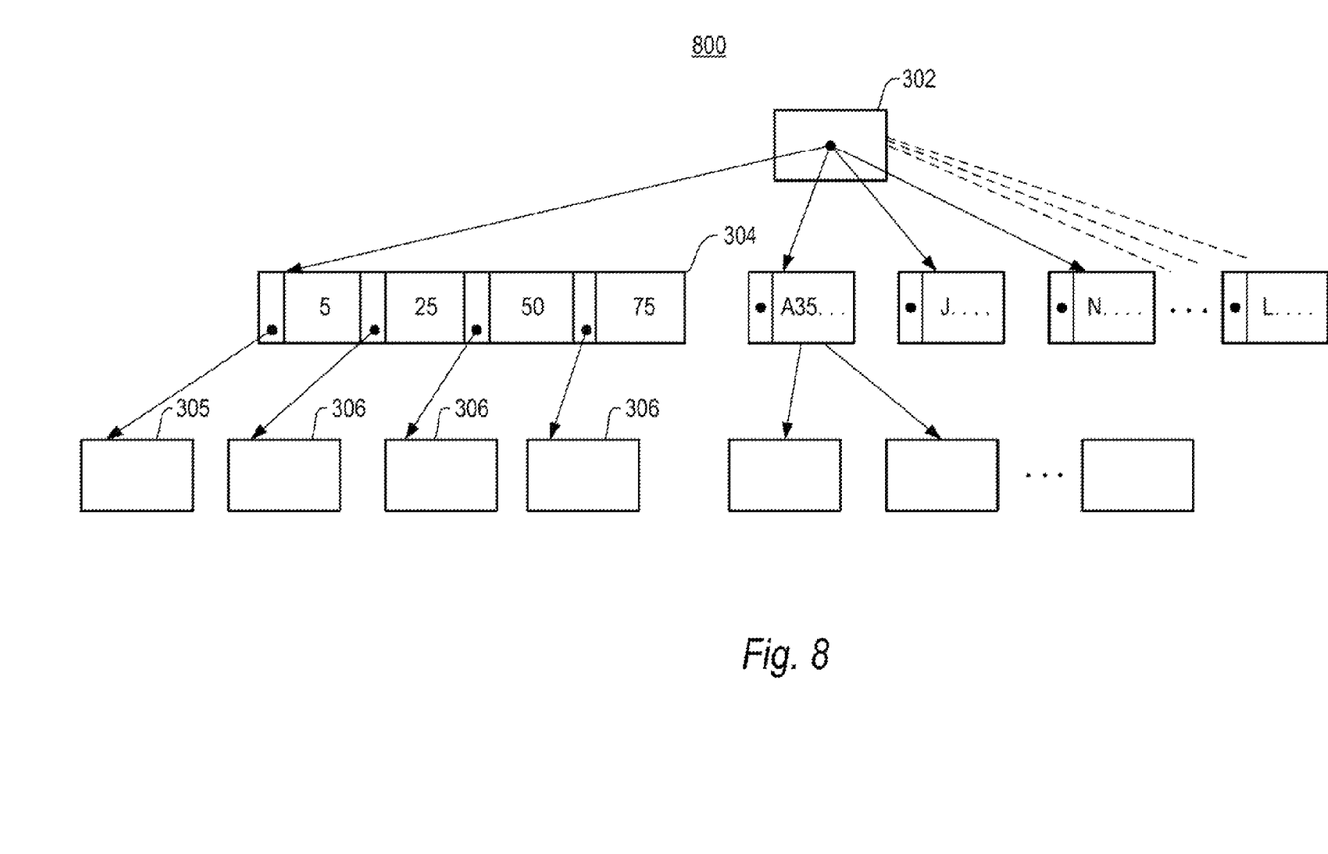
FIG. 8 is an illustrative data structure divided into multiple partitions.

One working example of an apparatus and method to reduce the database congestion demonstrated above is shown in FIGS. 5-8. In particular, FIG. 5 illustrates a flow diagram of a process to distribute key values and reduce database congestion. FIGS. 6-8 show various aspects of tree partitioning. The actions shown in FIGS. 6-8 will be discussed below with regard to the flow diagram of FIG. 5.

As shown in block 502 of FIG. 5, a key value that is within a first range of key values may be generated. The key may be generated in response to a request for data insertion. The data may be new data or it may be an update to data previously stored in the database. In an update, the previously stored data may be deleted followed by an insertion of the new data. FIG. 6 once again illustrates tree data structure 300 with an interior node 304 and four child nodes 305-308. DBM thread 606 is shown attempting to insert new data 608 into the tree. In the example of FIG. 6, key value 35 is generated and associated with data 608. Tree data structure 300 may be searched until the node containing the first range of key values is found. In the example of FIG. 6, the index entries of interior node 304 contain key values ranging from five to seventy five, therefore DBM thread 606 may attempt to insert data 608 in one of the child nodes of interior node 304. The insert may be carried out pursuant to the tree's illustrative restrictions recited above (e.g., maintain balance, two to four records per leaf node etc.). In view of the current state of the B-plus tree in FIG. 6, child node 306 is the best node to store data 608. In this example, child node 306 only stores two records and the insertion would not disrupt the tree's balance.

Referring back to FIG. 5, in block 504, it may be determined whether the distribution of key values is skewed in favor of the first range. Such determination may be made by determining whether the node containing the first range of key values is frequently latched by other processes such that the node is frequently inaccessible. DBM thread 606 of FIG. 6 may determine whether interior node 304 or leaf node 306 is frequently latched. As demonstrated above in FIG. 4, latch contentions occur when a high volume of threads or processes attempt to gain exclusive access to one or more nodes simultaneously. This is often due to a skewed distribution of key values in favor of a particular range. The probability of frequent latch contentions may be determined by analyzing past or current usage statistics maintained by DBM instructions 114.

If the distribution of key values is not skewed in favor of the first range, the generated key value may be associated with the data. Otherwise, a logical partition may be initiated, as shown in block 506. In another example, a number of logical partitions may be initiated. The logical partition may represent a second range of key values different from the first range. If more than one partition is generated, each logical partition may represent an alternate range different from the first range. Furthermore, a generated logical partition may be associated with a partition value. The partition value may be generated by way of a hash function whose input parameter is the key originally generated by DBM instructions 114. In another example, the partition value may be generated randomly. Alternatively, the partition value may be generated in a "round robin" method such that a partition value counter is incremented and the partition value is set to the current value of the partition value counter. Referring back to FIG. 5, the partition value may be concatenated or attached to the key value, as shown in block 508. The partition value may be pre-pended or appended to the key value.

FIG. 7A illustrates the existing key values of tree data structure 300 being pre-pended with a first new partition value, value "A," such that a new range of key values is created. The new range of key values may be referred to as partition "A." FIG. 7B shows the generation of a second new partition value, value "B," and the generation of interior node 702. The originally generated key value 35 is shown being pre-pended with partition value B, resulting in an altered key value B35. DBM instructions 114 may insert the altered key value B35 into interior node 702. This may establish a second range of key values within tree data structure 300, which may be referred to as partition B. Referring back to FIG. 5, the altered key value may be associated with the data, as shown in block 510. DBM instructions 114 may generate a new child node 704. FIG. 7B shows data 608 being stored in child node 704 and shows the altered key value "B35" associated with data 608. In addition, key value 75 and its associated child node 308 may be shifted from node 304 to node 702, which is associated with partition B, to further distribute the key values.

FIG. 7C illustrates an alternate approach to data structure partitioning. In FIG. 7C, every key stored in the tree is pre-pended with the value "A" so as to generate a first partition, partition "A." The newly generated key value 35 may be pre-pended with the value "B," resulting in the altered key value "B35." Rather than generating a new node, the data associated with "B35" may be appended to node 308. The example of FIG. 7C assumes that node 308 contained only three data records (i.e., A75, A80, an A85) before inserting data 608, which is associated with key value B35. The approach illustrated in FIG. 7C may be utilized to minimize latch contentions on node 306. When the storage limit of node 306 is reached, a new branch may be generated for partition "B" using conventional tree splitting techniques.

FIG. 8 illustrates a tree 800 with multiple partitions. Tree-like data structures, like the B-plus tree of FIG. 8, may be dynamic structures. Thus, DBM instructions 114 may continually add, delete, or merge partitions to maintain the structure's efficiency. Preferably, the partition layout should reflect the current trend of data usage within the tree in order to minimize congestion around certain nodes. The partitions may be distributed across the tree over time using conventional tree splitting techniques. While the partition values are attached to the key values, external clients accessing the data may still refer to the data using regular key values. DBM instructions 114 may configure processor 110 to convert the key value received from remote clients by attaching the appropriate partition value.

The dynamic nature of tree-like data structures may lead to frequent insertions and removals of new partition values therein, which may have a negative impact on the overall performance of the database. The impact may be minimized by associating the partitions with a first bit of the partition value and to gradually use more bits as partitions are added and to use less bits as partitions are removed.

This may be achieved by setting a predetermined number of consecutive lower ordered or higher ordered bits of the partition value to zero before associating the partition value with a new logical partition. Such setting of lowered order or higher ordered bits may be realized by executing a bitwise "AND" function with an appropriate bitmask. The maximum number of bits of the partition value may be the logarithm base two of the maximum number of allowed partitions in a given data structure. For example, if the maximum number of allowed partitions is $2^m$, the partition value may be $\log_2(2^m)=M$ bits in length. In case the maximum number of allowed partitions in a given data structure is not a power of two, the logarithm base two may be rounded up to the nearest integer. If the desired number of new partitions is $2^d$, the predetermined number of consecutive lower order or high order bits set to zero may be M-d, where d is the logarithm base two of the number of desired logical partitions $2^d$ (i.e., $\log_2(2^d)=d$). This ensures that only half of the partition values change, if the partitions are doubled or reduced by half. In the worst case, each partition value is re-generated and re-inserted into the structure. This worst case scenario may occur when the value of M is altered. If any keys are established in the data structure when the value of d is changed, the established keys may either remain unchanged or may be changed and re-inserted.

By way of example, the maximum number of partitions for an illustrative B-tree is four, which provides M=2 (i.e., $\log_2(4)=2$). Furthermore, a hash function F may be used to generate an initial partition value. However, it is understood that the initial partition value may be generated randomly or in a round robin fashion. In the following examples, a number of lower ordered bits will be set to zero. The hash value of $key_a$ may be $F(key_a)=01$ and the hash value of $key_b$ may be $F(key_b)=11$. The desired number of partitions may be $2^1$, which provides d=1 (i.e., $\log_2(2)=1$). Accordingly, 1 lower order bit of each hash value or initial partition value may be set to zero (i.e., M−d=2−1=1). Thus, the initial partition value resulting from $F(key_a)$ may be altered from 01 to 00 and the initial partition value resulting from $F(key_b)$ may be altered from 11 to 10. The two new logical partitions may be associated with $00key_a$ and $10key_b$. In an additional example, the partitions may be doubled from $2^1$ to $2^2$ (i.e., from 2 to 4), which provides d=2. Two additional incoming keys, $key_c$ and $key_d$, may have hash values of $F(key_c)=11$ and $F(key_d)=01$. Since M-d (i.e., 2-2) is equal to zero, the lower ordered bits of the initial partition value may be left untouched. Therefore, the four partition values may be $00key_a$, $10key_b$, $11 key_s$, and $01 key_s$. Rather than generating and inserting four new partition values, the only new partition values inserted into the data structure are $11 key_s$ and $01 key_d$, which were partially generated using fast bitwise operations. While the foregoing examples illustrate the use of lower ordered bits, it is understood that higher ordered bits may also be used.

The examples disclosed above may be realized in any computer-readable media for use by or in connection with an instruction execution system such as a computer/processor based system, an ASIC, or other system that can fetch or obtain the logic from computer-readable media and execute the instructions contained therein. "Computer-readable media" can be any media that can contain, store, or maintain programs and data for use by or in connection with the instruction execution system. Computer readable media may comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, RAM, a read-only memory ("ROM"), an erasable programmable read-only memory, or a portable compact disc.

Advantageously, the above-described apparatus and method enhances database performance by distributing key values optimally within a database. In this regard, multiple processes have faster access to the necessary data. In turn, users experience less performance degradation.

Although the disclosure herein has been described with reference to particular examples, it is to be understood that these examples are merely illustrative of the principles of the disclosure. While the examples above make reference to B-plus trees, the apparatus and method disclosed herein can be applied to any hierarchical data structure that relies on splitting and merging to maintain its balance, such as B-trees or B-link trees. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently.

The invention claimed is:

1. A computer apparatus, the computer apparatus comprising a processor to:
   generate a key value that is within a first range of key values;
   determine whether a distribution of key values stored in a hierarchical data structure of interlinked nodes is skewed in favor of the first range of key values;
   if the distribution of key values stored in the hierarchical data structure is skewed in favor of the first range of key values, initiate a logical partition, the logical partition representing a second range of key values different from the first range, the logical partition being associated with a partition value;
   attach the partition value to the generated key value so as to generate an altered key value; and
   associate the altered key value with data.

2. The computer apparatus of claim 1, wherein the first range of key values is stored in a node within the hierarchical data structure of interlinked nodes.

3. The computer apparatus of claim 2, wherein to determine whether the distribution is skewed in favor of the first range of key values, the processor is to determine whether the node is frequently latched by other processes such that the node is frequently unavailable.

4. The computer apparatus of claim 1, wherein the hierarchical data structure of interlinked nodes is a B-plus tree data structure or a B-tree data structure.

5. The computer apparatus of claim 1, wherein the processor is to apply a hashing function to the key value so as to generate the partition value.

6. The computer apparatus of claim 1, wherein the processor is to select the partition value randomly.

7. The computer apparatus of claim 1, wherein the processor is to:
   increment a partition value counter; and
   set the partition value equal to the partition value counter.

8. The computer apparatus of claim 1, wherein the generated key value is generated for the data that is specified by a data insertion request.

9. A computer apparatus, the computer apparatus comprising a processor to:
   generate a key value for data, the key value being within a range of key values;
   determine whether a distribution of key values stored in a hierarchical data structure of interlinked nodes is skewed in favor of the range of key values, such that a node of the interlinked nodes that contains the range of key values is frequently latched;
   in response to determining that the distribution of key values is skewed in favor of the range of key values:
   generate a number of logical partitions, each logical partition representing an alternate range of key values different from the range of key values;
   associate each logical partition with a partition value having a maximum bit size, the partition value having a predetermined number of consecutive bits set to zero;
   attach the partition value associated with one of the logical partitions to the generated key value to produce an altered key value; and
   associate the data with the altered key value.

10. The computer apparatus of claim 9, wherein the hierarchical data structure of interlinked nodes is a B-plus tree data structure or a B-tree data structure.

11. The computer apparatus of claim 9, wherein the maximum bit size comprises a logarithm base two of a maximum number of partitions allowed in the hierarchical data structure of interlinked nodes.

12. The computer apparatus of claim 11, wherein the predetermined number of consecutive bits is equal to the maximum bit size minus a logarithm base two of the number of logical partitions.

13. The computer apparatus of claim 12, wherein the processor is to:
   apply a hashing function to the generated key value so as to generate an initial partition value; and
   set the predetermined number of consecutive bits to zero so as to generate the partition value.

14. The computer apparatus of claim 12, wherein the processor is to:
   select the partition value randomly; and
   set the predetermined number of consecutive bits to zero so as to generate the partition value.

15. A non-transitory computer readable medium having instructions stored therein which if executed cause a processor to:
   generate a key value for data, the key value being within a first range of key values;
   determine whether a distribution of key values stored in a hierarchical data structure of interlinked nodes is skewed in favor of the first range of key values;
   in response to determining that the distribution of key values stored in the hierarchical data structure is skewed in favor of the first range of key values:
   generate a logical partition, the logical partition representing a second range of key values different from the first range, the logical partition being associated with a partition value;
   attach the partition value to the generated key value to produce an altered key value; and
   associate the altered key value with the data.

16. The computer readable medium of claim 15, wherein the data is specified by a data insertion request.

17. The computer readable medium of claim 15, wherein a node within the hierarchical data structure of interlinked nodes contains the first range of key values.

18. The computer readable medium of claim 17, wherein to determine whether the distribution of key values is skewed in favor of the first range of key values the instructions if executed cause the processor to determine whether the node is frequently latched by other processes such that the node is frequently unavailable.

19. The computer readable medium of claim 15, wherein the hierarchical data structure of interlinked nodes is a B-plus tree data structure or a B-tree data structure.

20. The computer readable medium of claim 15, wherein the instructions if executed further cause the processor to apply a hashing function to the generated key value so as to generate the partition value.

\* \* \* \* \*